J. MELEG.
RESILIENT WHEEL.
APPLICATION FILED JAN. 13, 1920.
1,353,175.
Patented Sept. 21, 1920.
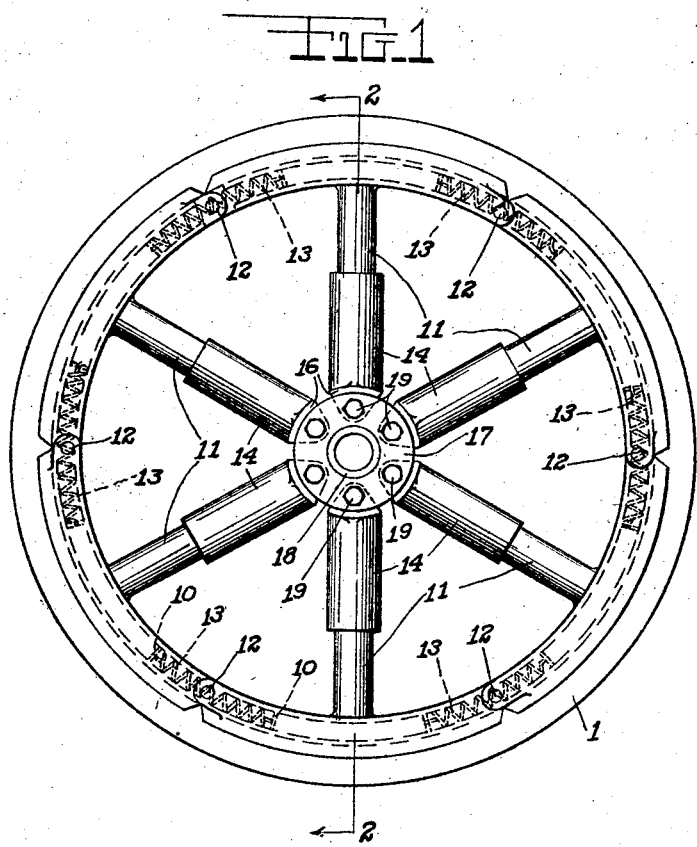
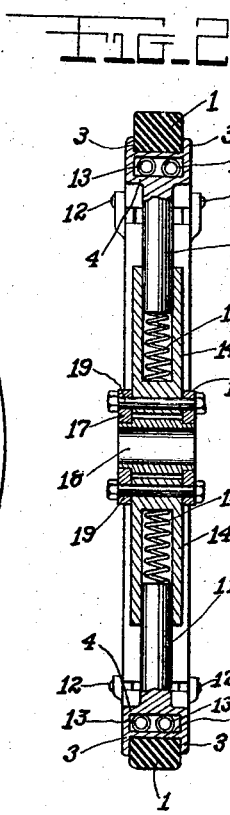
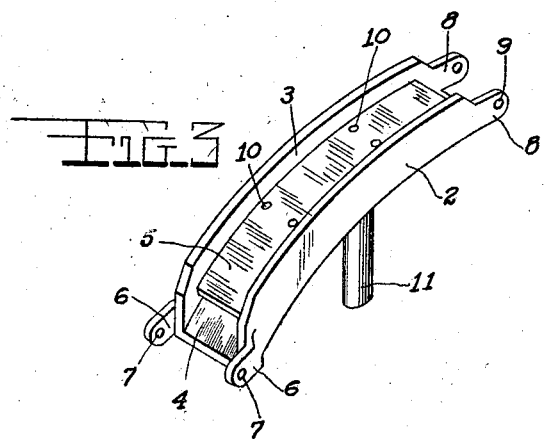
INVENTOR
Joseph Meleg
BY
Harry Jacobson
ATTORNEY

UNITED STATES PATENT OFFICE.

JOSEPH MELEG, OF BEAVER FALLS, PENNSYLVANIA.

RESILIENT WHEEL.

1,353,175.

Specification of Letters Patent.  Patented Sept. 21, 1920.

Application filed January 13, 1920. Serial No. 351,213.

*To all whom it may concern:*

Be it known that I, JOSEPH MELEG, citizen of Hungary, and resident of Beaver Falls, in the county of Beaver and State of Pennsylvania, have invented certain new and useful Improvements in Resilient Wheels, of which the following is a specification.

This invention relates to resilient wheels, and has for its object the provision of a simple and efficient rim and spokes for absorbing shocks to which the wheel may be subjected.

For the attainment of this and other objects, I employ the devices shown in their preferred forms in the accompanying drawings, in which Figure 1 is an elevation of my improved wheel.

Fig. 2 is a vertical section on line 2—2 of Fig. 1.

Fig. 3 is a perspective view of one of the rim sections.

In the practical embodiment of my invention, the tire 1, of the usual type, is held by a rim composed of a series of similar sections 2. Each of said sections has side walls suitably formed to hold tire 1 in place. The bottom 4 of section 2 is of such curvature that when all the sections are joined, a cylindrical surface is provided about the center of the wheel in the normal position thereof. A partition 5 is concentrically arranged in spaced relation to the bottom 4, between side walls 3, the function of said partition being to provide a support for the inner surface of tire 1. Ears 8 having holes 9 therein, project from one end of section 2 and ears 6 having similar holes 7 therein, and adapted to fit outside of ears 8 of the adjacent section, project from the other end of said section, bolts, or rivets 12 being used to pivotally fasten the various sections together.

A pair of springs 13 is positioned between partition 5 and bottom 4 of section 2, one end of said springs being attached to pins 10 of one section, the other end of said springs being attached to pins 10 of the adjacent section whereby the movement of said sections about bolt 12 is yieldingly limited, said pins 10 extending between and being suitably secured in the bottom 4, and in the partition 5.

A plunger rod 11 projects from the inner side of the bottom 4 and is inserted into the hollow spoke 14 over the spring 15 in said spoke. The shape of said spoke 14 is preferably cylindrical, excepting the inner end 16, which terminates in flat surfaces for ease in fastening. Disks 17 are arranged to hold the flat ends 16 of spokes 14 between them, and hold the usual hub 18 between them as well. Bolts 19 hold parts 17, 18 and 14 together, each of said bolts also acting as a pin about which spoke 14 may pivot in adjusting itself to the various stresses exerted on said spoke.

A radial blow on the tire between spokes, causes the spokes nearest the blow and those opposite, to be compressed, plunger rods 11 moving into spokes 14 against the action of springs 15, whereby some of the shock is absorbed, whereas those spokes approximately at right angles to the direction of the blow are subjected to a force tending to elongate them, plunger rod 11 therefore moving out of spoke 14. Due to these movements, sections 2 swing about pins 12 to a greater or lesser degree, against the action of springs 13, whereby the greater part of the shock is absorbed and prevented from being suddenly transmitted to the wheel hub to jar the vehicle to which the wheel is attached. Blows or shocks on the wheel in directions other than radial will have an effect similar to that described above, with the addition of a tendency to cause spokes 14 to swing somewhat about bolts 19 in adjusting themselves to the oblique blow.

What I claim is:—

In a resilient wheel, a rim comprising a series of sections, each of said sections comprising a curved base, a radial spoke section integral with said base projecting inwardly therefrom, side walls for holding a tire therebetween outstanding approximately at right angles from said base, a curved partition for supporting the inner surface of said tire arranged concentrically with, and spaced from said base, between said side walls, a pair of ears at one end of said section formed from said side walls, continuous and in the same plane with said walls, a second pair of ears at the other end of said section bent from said side walls and spaced apart a sufficient distance to receive a pair of ears similar to that first mentioned, of the adjacent section, between them, pins arranged between said partition and said base, and springs secured to the pins of adjacent sections for yieldingly joining said adjacent sections together.

Signed at Beaver Falls, in the county of Beaver and State of Pennsylvania, this tenth day of January, A. D. 1920.

JOSEPH MELEG.